Jan. 4, 1966  P. L. MAY  3,227,262
BALE THROWER FOR HAY BALER
Original Filed Nov. 17, 1960  4 Sheets-Sheet 1

INVENTOR.
Patrick L. May
BY
Paul O. Pippel
Atty.

INVENTOR.
Patrick L. May
BY
Paul O. Pippel
Atty

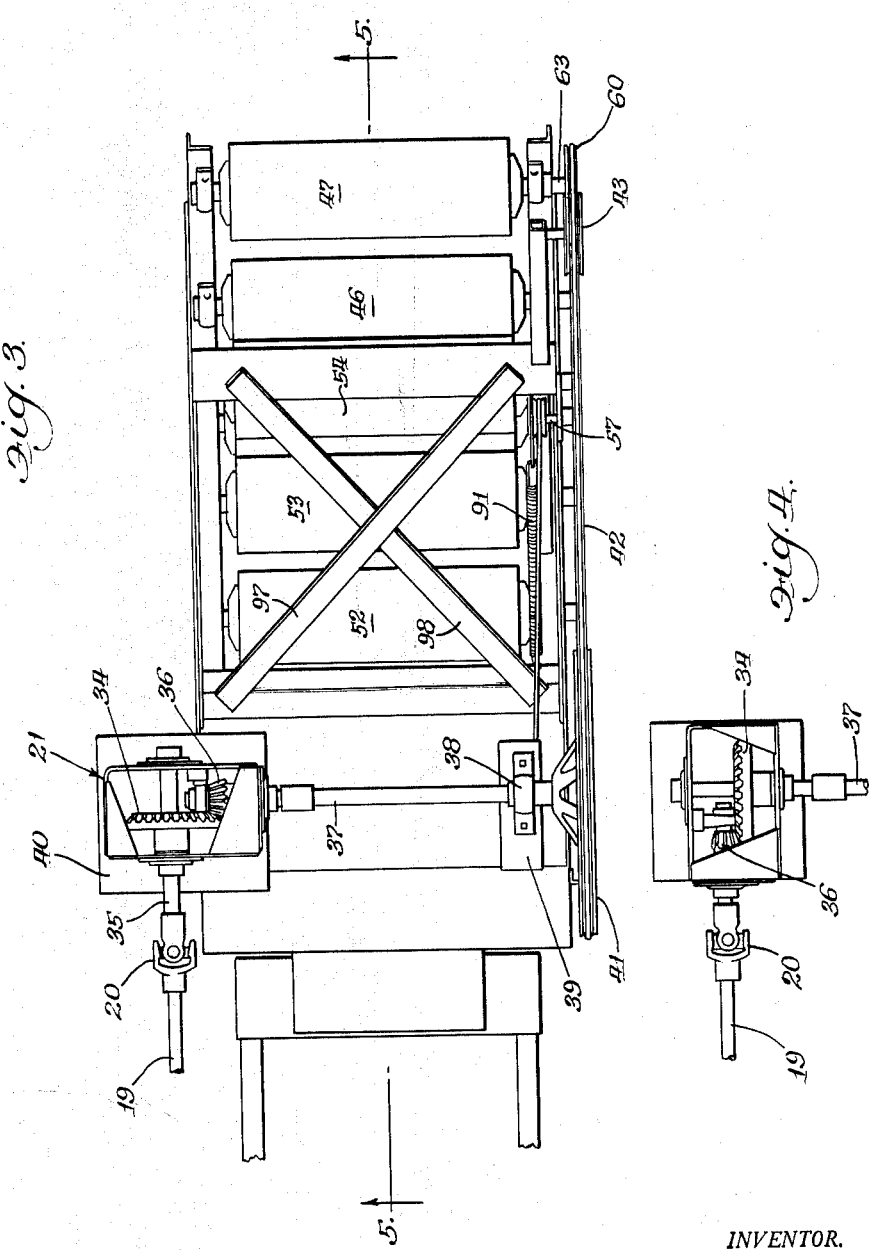

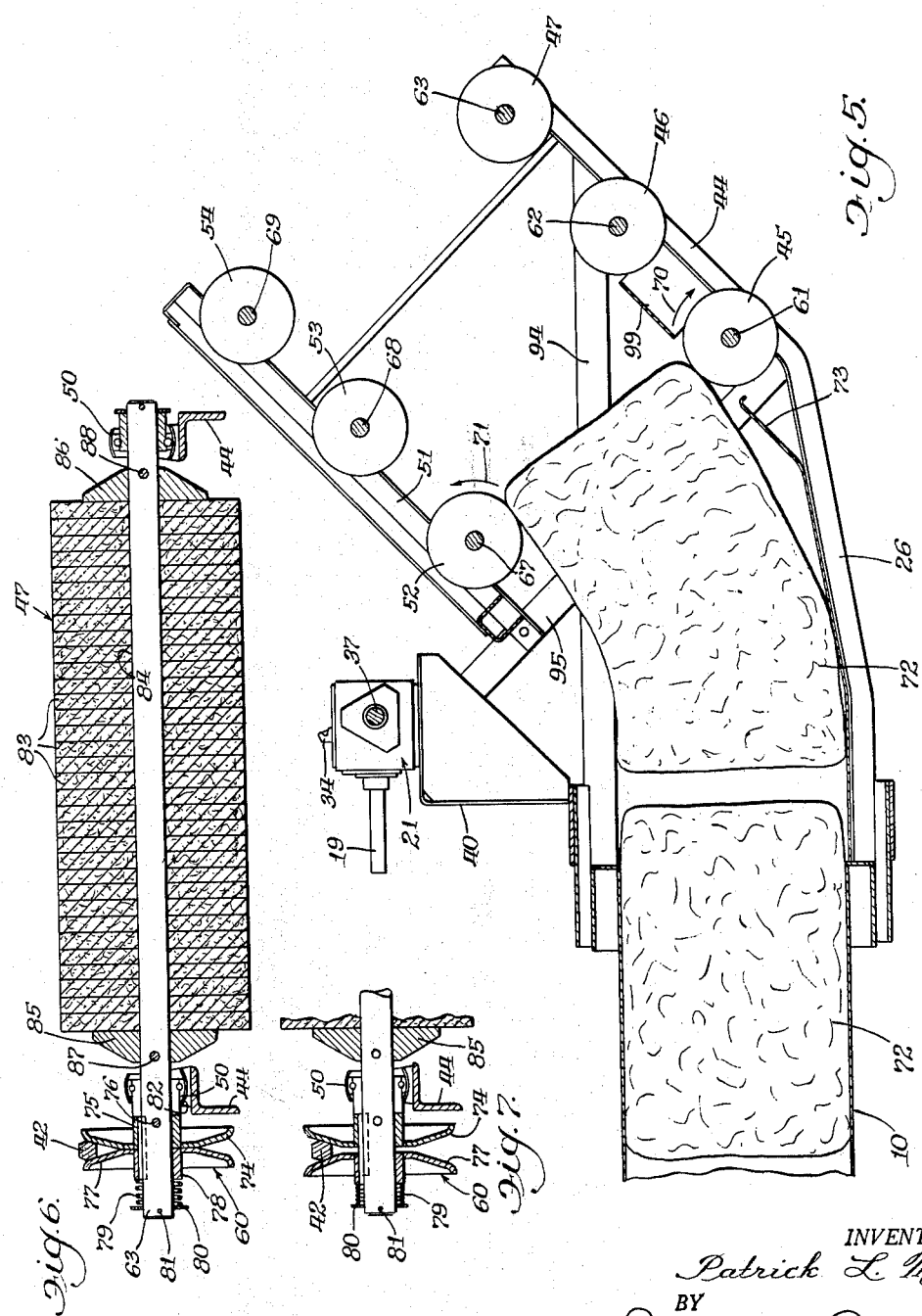

United States Patent Office 3,227,262
Patented Jan. 4, 1966

3,227,262
BALE THROWER FOR HAY BALER
Patrick Lewis May, Memphis, Tenn., assignor to International Harvester Company, Chicago, Ill., a corporation of New Jersey
Continuation of application Ser. No. 69,883, Nov. 17, 1960. This application Sept. 3, 1963, Ser. No. 307,764
10 Claims. (Cl. 198—128)

This is a continuation of my copending application No. 69,883, filed on November 17, 1960, now abandoned.

It is a principal object of this invention to provide means for throwing bales of hay from a hay baler to a trailing wagon.

Another important object of this invention is the provision of a series of roller elements rotatably driven at high speed and gripping the upper and lower surfaces of a bale of hay, which is discharged from the rollers at a high rate of speed and in a trajectory adequate to deposit the bale in a trailing wagon.

A further object of this invention is to provide means for varying the speed of a bale thrower, whereby a bale of hay may be propelled for varying distances through space and deposited in a wagon.

Other important objects and advantages will become apparent from the specification and drawings.

In the drawings:

FIGURE 3 is a top-plan view of the device shown in FIGURE 2 taken on line 3—3 of FIGURE 2;

FIGURE 4 is a detail view of the gear drive employed in FIGURE 3 arranged in an optional manner for gaining different speeds of the conveyor;

FIGURE 5 is a sectional view taken on the line 5—5 of FIGURE 3;

FIGURE 6 is a sectional view taken through one of the rollers of this invention; and FIGURE 7 is a view of a portion of the V-belt drive mechanism for the roller of FIGURE 6, showing it in a different driving arrangement.

Figure 1:
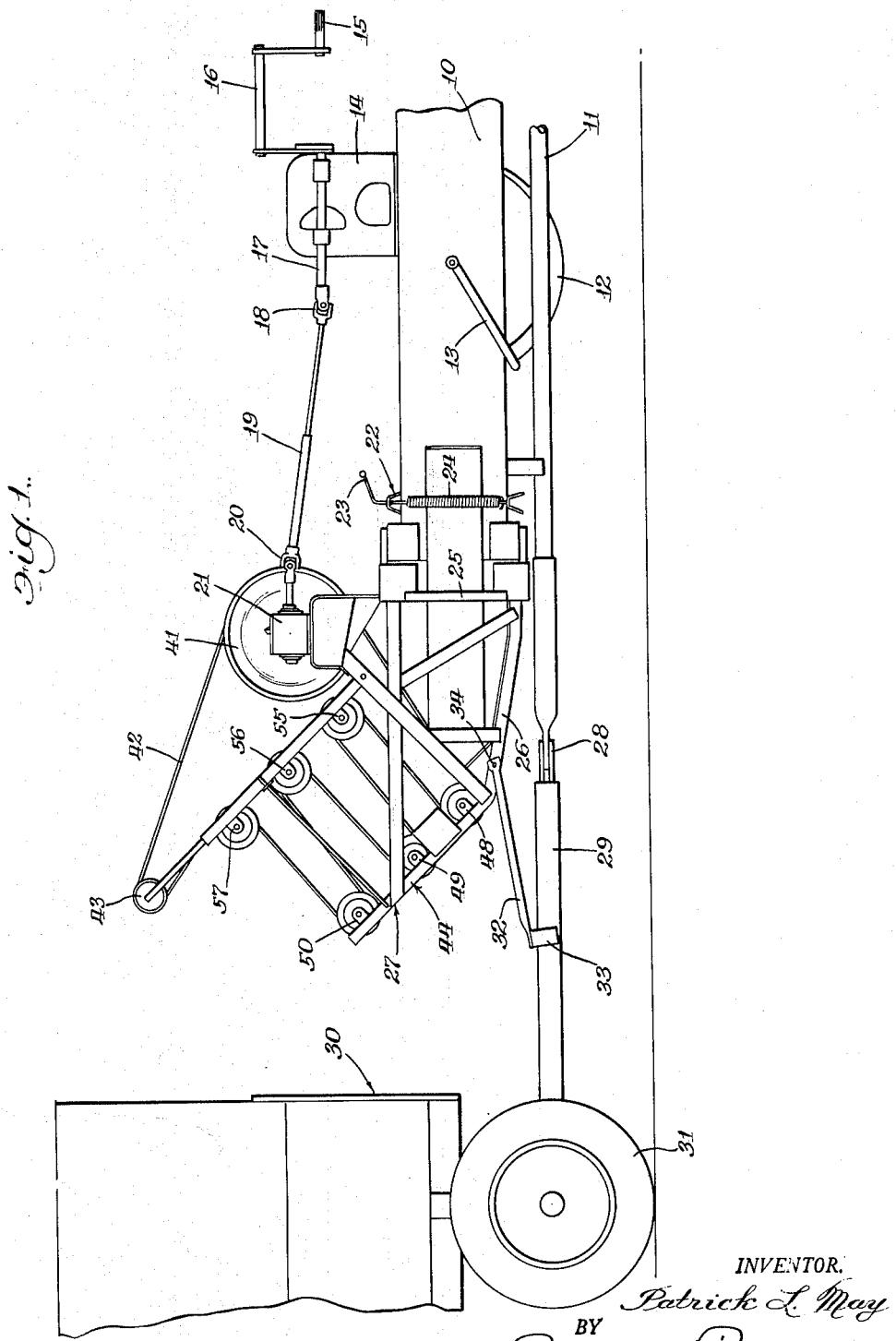
FIGURE 1 is a side view showing the rear portion of a hay baler and a trailing wagon.

In the drawings, the numeral 10 indicates generally a bale-forming chamber, disposed in the line of draft of the implement. Bale-forming chamber 10 is mounted on a frame 11 and is equipped with a twine or wire-carrying needle 12 mounted on crank 13. A super structure 14 carries drive elements.

Drive is secured from tractor power take-off 15. The shaft 15 is joined by crank 16, which is utilized to pack harvested hay into the bale-forming chamber 10 by means not shown. The crank 16 carries drive to shaft 17 disposed in a longitudinal direction substantially parallel to and spaced above the bale-forming chamber 10.

Shaft 17 is journaled for bearing support in the super structure 14 carried on forming chamber 10 and joins universal joint 18 which, in turn, joins telescoping shafts 19. Telescoping shafts 19 terminate in a juncture with universal joint 20, which is utilized to transmit drive from power take-off shaft 15 to gear box 21 at the rear of the implement.

A bale chamber tensioning means 22 is provided at the rear of bale chamber 10. The tensioning means 22 includes a hand crank 23 and coil spring 24, which holds the upper and lower walls of the bale chamber 10 together under a predetermined load. The rear end 25 of bale chamber 10 is where bales emerge from the chamber 10. An inclined floor or trough 26 at the outer end 25 of the bale chamber 10 provides a surface over which the bales slide. The continuous formation of bales in the forward end of the bale chamber 10 causes the preceding bales to be pushed rearwardly, so that no auxiliary means for conveying the bales up incline 26 is necessary. Inclined floor 26 joins to the bale thrower 27.

The baler has a rearwardly extending hitch member 28 located at a position below the inclined floor 26. Hitch member 28 is joined to tongue 29 of wagon 30 mounted on wheels 31. Auxiliary bracing member 32 is joined at 33 to the wagon tongue 29 and at 34 to the inclined floor 26 of the hay baler.

In FIGURE 3, gear box 21 contains large bevel gear 34 on shaft 35 which extends from universal joint 20 through housing 21. The large bevel gear 34 engages the relatively small bevel gear 36 on shaft 37, which is disposed at a right angle to shaft 35. Large drive gear 34 and small driven gear 36 insure a fast drive for output shaft 37. Shaft 37 is journaled in bearing 38 on pedestal 39 of frame 11, similar to pedestal 40 on which the gear housing 21 is mounted. The outer end of shaft 37 has mounted thereon a large V-belt pulley 41. A double-faced V-belt 42 on pulley 41 extends upwardly and rearwardly as shown in FIGURES 1 and 2 and engages small idler pulley 43.

The bale thrower 27 comprises a frame structure fastened to the discharge portion of the baler. The structure includes a bottom or lower frame member 44, which is an extension of inclined discharge trough 26. The bottom 44 of bale thrower 27 is inclined at a steeper angle than trough 26 and has a plurality of rollers 45, 46, and 47 arranged therealong and journaled in pillow-block bearings 48, 49, and 50 supported on frame member 44. Upper frame member 51, which is parallel to bottom 44, carries rollers 52, 53, and 54 supported on hanger-type bearings 55, 56, and 57. Bearings 55, 56, and 57 are similar to pillow-block bearings 48, 49, and 50. Rollers 45, 46, and 47 on the bottom of the device cooperate with upper rollers 52, 53, and 54 to form a bale transfer passageway and to engage a hay bale therebetween. By rotating the rollers as shown the bale is forcibly discharged upwardly and rearwardly at the angle of inclination of the parallel frame members 44 and 51. As shown in FIGURE 2, V-belt pulleys 58, 59, and 60 are mounted on the outer ends of shafts 61, 62, and 63, respectively, carrying the rollers 45, 46, and 47 constituting the lower series of rollers of this bale-throwing device. Similarly the upper rollers have V-pulleys 64, 65, and 66 mounted on shafts 67, 68, and 69, respectively.

Figure 2:
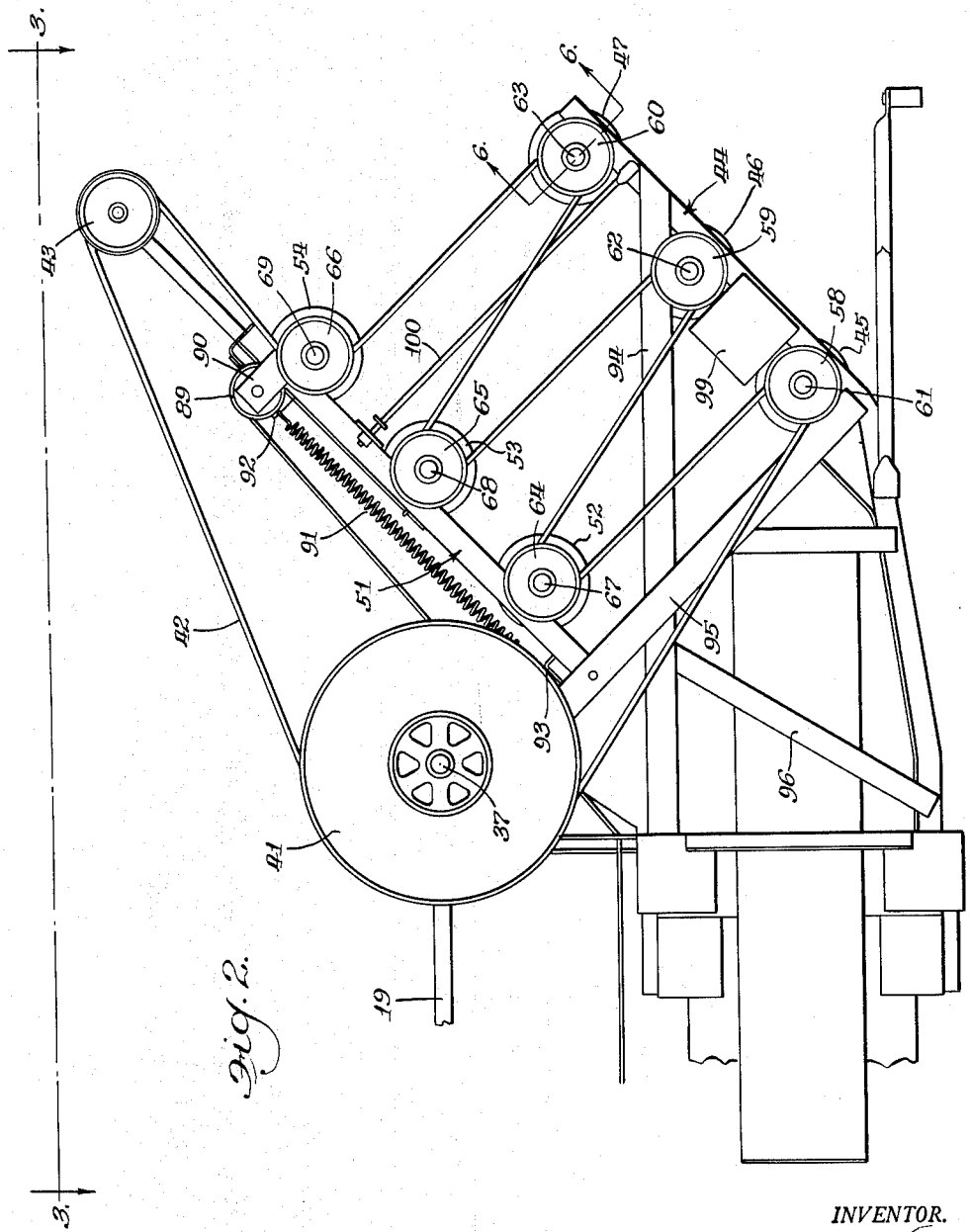
FIGURE 2 is a side view of the discharge part of the hay baler shown in FIGURE 1.

As shown in FIGURE 2, the V-belt 42 passes sinuously from idler pulley 43 over the V-pulley 66 on roller 54, down and under the V-pulley 60 on roller 47, then upwardly and over the V-pulley 65 on center roller 53, down and under pulley 59 on the roller 46, upwardly over the V-pulley 64 on roller 52 and then down under V-pulley 58 on lower shaft 61. The V-belt 42 then continues up around the large V-pulley 41 and back to its starting point at idler 43.

The serpentine path of the V-belt 42 causes rotation of the lower rollers, as shown by arrow 70 in FIGURE 5, and rotation of the upper rollers, as shown by arrow 71. Thus as bales 72 formed in the bale-forming chamber 10 are discharged to the inclined floor 26, they are engaged by the rollers 45 and 52 and propelled upwardly and rearwardly into the box of the wagon 30. Element 73, the end of the trough 26, is bent upward to guide the bale into the rolls.

The belt 42 is double V-belt, a V on both upper and lower surfaces, as shown in FIGURES 6 and 7. When the belt is drawn over and under the V-pulleys shown in FIGURE 2, first one side and then the other side of the belt engages the V-pulleys.

The V-pulleys 58, 59, 60, 64, 65, and 66 are made as shown in FIGURES 6 and 7. The description given here of V-pulley 60 is equally applicable to all of the other pulleys. The pulley 60 is divided into two halves, one half 74 having an integral hub 75 is affixed to the shaft 63 by means of a cross pin 76. The other pulley half 77 has an integral annular flange 78 which slides on the shaft 63, producing variable spacings between the pulley halves 74 and 77, as shown in FIGURE 7. Spring 79, which normally urges the pulley half 77 against and/or toward the pulley half 74, abuts against washer-like member 80, which is held on shaft 63 by pin 81. The spring allows the V-pulley to change its effective diameter as the idler is tightened or loosened, thereby effecting a change in the speed of the rollers. The idler position is controlled by rope 110 shown in FIGURE 2, that the operator can pull from the tractor seat.

In FIGURE 6, shaft 63 for roller 47 is mounted on bearings 50 on frame 44. The bearings 50 are of the pillow-block type and are self-aligning because of the spherical housings 82. Spherical housings 82 prevent binding when the rollers are slightly misaligned and insure free and easy rotation thereof.

The construction of the rolls used in ejecting the bales is shown in detail in FIGURE 6. It should be understood that the construction may be any one of many forms and that the form shown is only one acceptable form.

The roller 47 comprises a plurality of laminated disks of rubber with or without fabric impregnations. These may be rubber-tire carcass disks as shown at 83. The tire carcass disks have a central aperture 84 for fitting over the shaft 63. The disks 83 are compressed together by end collars 85 and 86 at opposite ends of the roller. The collars 85 and 86 are affixed to shaft 63 by cross pins 87 and 88 hold the laminated tire carcass disks 83 in assembled relationship. The disks are held under slight compression to form a roughened and tough surface for engagement with the bale 72. The tire carcass has a fabric inner liner, about which the rubber is molded, thus constituting a reinforcement for the roller and insuring it a long life. Any roll, whether made of flexible or rigid material and with or without special surface conformations, is operable in the bale thrower.

As shown in FIGURE 2, a rope 110 from the tractor seat goes around roller 89 and fastens to a square rod. Spring 91 fastens to this square rod at the same point that the rope is attached. This square rod is the same member that the belt idler 43 is mounted on. The rod slides through square holes in the upper frame 51. The operator pulls the rope to tighten the belt. Tightening the belt reduces the effective diameter of the spring load V-sheaves 66 causing the speed of the rollers to be increased.

A locking device (not shown in drawings) near the front of the baler locks the rope so that a particular roller speed can be maintained. The purpose of the spring is to return the idler pulley to a looser position when the rope 110 is released and locked at a different point. With the belt idler in a looser position, the effective diameter of the spring loaded V-pulleys becomes larger, thereby slowing the speed of the rollers.

As shown in the drawings, substantial bracing is used in the bale thrower to prevent distortion and to maintain the fixed spacing of the rollers 45, 46, and 47 on the lower side and 52, 53, and 54 on the upper side. Reinforcing members are shown at 94 in FIGURE 5, 95 in FIGURE 5, 96 in FIGURE 2, and a cross-bracing in FIGURE 3 at 97 and 98.

In FIGURE 2, a spacer member 99 between the lowermost rollers 45 and 46 of the lower series of rollers prevents undesired angling of the discharging bale 72 between the rolls. Member 99 spaced between the rolls 45 and 46 insures the feeding of the bale 72 to the active driving surfaces of the roller 46 from the roller 45. A reinforcing brace member 100 is provided substantially at the discharge end of the ejecting mechanism and is disposed between the lower parallel frame member 44 and the upper parallel frame member 51 intermediate rollers 46 and 47 on the lower side and rollers 53 and 54 on the upper side.

In operation, the implement is propelled through a field of hay, where hay is picked up and fed into the baleforming chamber 10 and formed into bales and, thence, fed rearwardly to the discharge opening 25. The bales are pushed up the inclined trough 26 by succeeding bales. Each bale is guided by the member 73 onto the roller 45 and beneath the driven roller 52. Immediately upon the bale 72 entering between the rolls 45 and 52, which are rotating at very high speeds in the direction of the arrows 70 and 71, respectively, the bale is pulled and directed upwardly and rearwardly between the similarly driven rolls 46 and 47 on the lower side and 53 and 54 on the upper side, thus throwing the bale into trailing wagon 30. The operation continues until the wagon 30 is filled with bales, whereafter the wagon is emptied and the operation of baling resumed.

In certain instances when the throwing mechanism is not needed, there is provided an alternate position of the gear box 21, shown in FIGURE 4, wherein the gear box is turned at right angles to its present position. The bevel gear 36 then becomes the driving gear and the large bevel gear 34 becomes the driven gear whereby the speed of the power take-off shaft 15 from the tractor or other pulling vehicle is reduced. In such position, the rollers rotate at considerably reduced speeds and allow manual loading of bales from the baler to a trailer.

I am aware that numerous details of construction may be varied throughout a wide range without departing from the principles disclosed herein. I do not, therefore, propose to limit the patent granted hereon otherwise than as indicated by the appended claims.

What is claimed is:

1. A bale thrower for attachment to a hay baler, comprising: a first support, a first group of rollers for accelerating a base of hay to trajection velocity mounted along said first support, a second support, a second group of rollers for accelerating a bale of hay to trajection velocity mounted along said second support, said first and said second groups of rollers together forming a bale transfer passageway having a bale inlet at one end and a bale outlet at the other end thereof, each of said rollers extending transversely of said passageway and being engageable directly with a bale of hay in said passageway, mounting means joined to at least one of said supports for attachment of said bale thrower to a hay baler, and drive means connected to said rollers for rotating them at bale-trajecting speed, whereby a bale of hay inserted in said bale inlet and traversing said passageway will be accelerated to a velocity sufficient to traject said bale to a point substantially removed from said bale thrower.

2. A bale thrower as recited in claim 1, wherein each roller of said first group is paired with a roller of said second group, the rollers of each such pair of rollers being parallel to one another, and wherein the inlet of said bale transfer passageway comprises one of said pairs of rollers, the outlet of said bale transfer passageway comprises another of said pairs of rollers, the distance between the centerlines of adjacent rollers of a group is less than the length of a bale of hay, and the distance between said one pair of rollers and said other pair of rollers is at least equal to the distance required for a bale of hay to attain trajection velocity when said rollers are rotated at said bale-trajecting speed.

3. A bale thrower as recited in claim 2, wherein said bale transfer passageway has a lower side and an upper side and said first group of rollers comprises said lower side and said second group of rollers comprises said upper side.

4. A bale thrower as recited in claim 3, wherein a spacer member for preventing jamming of said bales is located between two adjacent rollers of said lower side.

5. A bale thrower as recited in claim 1, wherein said means for rotating said rollers comprises a continuous drive belt looped alternately under a roller on one side of said passageway and over the succeeding roller on the other side of said passageway, and power supply means cooperating with said belt for moving it around said rollers toward said inlet at bale-trajecting speed.

6. A bale thrower as recited in claim 5, wherein an adjustable belt pulley for said belt is attached to each said roller for varying the speed of said bale thrower.

7. A bale thrower as recited in claim 6, wherein each said pulley comprises a first portion fixed to its roller and a second portion slidable longitudinally along its roller.

8. A bale thrower as recited in claim 4, wherein: said rollers are made of a plurality of rubber tire carcass disks held under endwise compression.

9. A bale thrower as recited in claim 1, wherein: each group of rollers consists of three rollers.

10. A bale thrower for attachment to a hay baler, comprising: mounting means for attachment of said bale thrower to a hay baler, said mounting means including a bale passageway, a supporting structure including upper and lower members projecting from said mounting means in an upwardly direction longitudinally of said bale passageway, said upper member being spaced from said lower member, a plurality of rollers for trajecting a bale of hay rotatably mounted on said upper member and extending transversely of said bale passageway, a plurality of rollers for trajecting a bale of hay rotatably mounted on said lower member and extending transversely of said bale passageway, said upper and lower bale-trajecting rollers forming an extension of said bale passageway and being directly engageable with a bale of hay located therein, and drive means connected to said rollers for rotation thereof at bale trajecting speed.

References Cited by the Examiner

UNITED STATES PATENTS

| | | | |
|---|---|---|---|
| 530,333 | 12/1894 | Garland | 198—127 |
| 1,767,914 | 6/1930 | Boudin | 198—127 |
| 2,007,910 | 7/1935 | Stephens | 198—203 |
| 2,135,214 | 11/1938 | Moore. | |
| 2,169,623 | 8/1939 | Weiss | 198—192 |
| 2,219,856 | 10/1940 | Weston. | |
| 2,744,616 | 5/1956 | Shields | 198—167 |
| 3,095,961 | 7/1963 | Hollyday | 198—128 |
| 3,132,754 | 5/1964 | Smoker | 214—83 |

SAMUEL F. COLEMAN, *Primary Examiner.*

ERNEST A FALLER, *Examiner.*